(12) United States Patent
Larson et al.

(10) Patent No.: US 6,587,898 B1
(45) Date of Patent: Jul. 1, 2003

(54) UNIVERSAL SERIAL BUS PC SYNCHRONIZATION ALGORITHM FOR PERIPHERAL DEVICES

(75) Inventors: Mark A. Larson, Austin, TX (US); Benjamen G. Tyner, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 455 days.

(21) Appl. No.: 09/636,116

(22) Filed: Aug. 10, 2000

(51) Int. Cl.[7] .............................................. G06F 13/00
(52) U.S. Cl. ............................. 710/31; 710/33; 710/48; 712/225; 709/200
(58) Field of Search ......................... 710/1, 3, 20, 29, 710/31, 33, 34, 36, 38, 39, 52, 48, 61; 712/225; 709/104, 200

(56) References Cited

U.S. PATENT DOCUMENTS

| | | | | |
|---|---|---|---|---|
| 5,163,154 A | * | 11/1992 | Bournas et al. .............. 395/775 |
| 5,442,770 A | * | 8/1995 | Barratt ........................... 711/3 |
| 5,535,197 A | * | 7/1996 | Cotton ........................ 370/60 |
| 5,548,589 A | * | 8/1996 | Jeon et al. .................. 370/60.1 |
| 5,828,835 A | * | 10/1998 | Isfeld et al. ................. 709/200 |
| 5,978,889 A | * | 11/1999 | Zigras ......................... 711/149 |
| 6,016,307 A | * | 1/2000 | Kaplan et al. .............. 370/238 |

* cited by examiner

Primary Examiner—Jeffrey Gaffin
Assistant Examiner—Rijue Mai
(74) Attorney, Agent, or Firm—Baker Botts L.L.P.

(57) ABSTRACT

Provided is a method, a computer program product, and a computer system each of which features queuing data transfers between a data port and a system memory to minimize the latency between queuing a data transfer and effectuating the transfer of the same and to remove the chance of more than one device trying to talk to the OS at the same time through the same port. This facilitates backwards compatibility of non-USB compatible computer resources, such as applications, operating systems (O/S) and the like, with USB compatible peripheral devices.

28 Claims, 8 Drawing Sheets

UNIVERSAL SERIAL BUS PC SYNCHRONIZATION ALGORITHM FOR PERIPHERAL DEVICES

BACKGROUND OF THE INVENTION

1. Field of the Invention

The present invention relates to computer systems. More particularly, the present invention is directed to communication between computer resources and USB-compatible peripheral devices.

2. Description of the Related Art

Referring to FIG. 1 typical computer systems, such as computer 14, includes one or more system buses 22 placing various components of the system in data communication. For example, a microprocessor 24 is placed in data communication with both a read only memory (ROM) 26 and random access memory (RAM) 28 via the system bus 22. The ROM 26 contains among other code, the Basic Input-Output system (BIOS) which controls basic hardware operation such as the interaction with peripheral components such as disk drives 30 and 32, as well as the keyboard 34. The RAM 28 is the main memory into which the operating system and application programs are loaded and affords at least 32 megabytes of memory space. The memory management chip 36 is in data communication with the system bus 22 to control direct memory access (DMA) operations. DMA operations include passing data between the RAM 28 and the hard disk drive 30 and the floppy disk drive 32.

Also in data communication with the system bus 22 are various I/O controllers: a keyboard controller 38, a mouse controller 40 and a video controller 42. The keyboard controller 38 provides a hardware interface for the keyboard 34, the mouse controller 40 provides the hardware interface for a mouse 46, or other point and click device, and the video controller 42 provides a hardware interface for a display 48. Each of the aforementioned I/O controllers is in data communication with an interrupt controller over an interrupt request line. The interrupt controller is in data communication with the processor to prioritize the interrupts it receives and transmits interrupt requests to the processor. A drawback with the aforementioned architecture is that a limited number of interrupt request lines are provided. This limited the number of I/O devices that a computer system could support.

A Universal Serial Bus (USB) specification has been developed to increase the number of peripheral devices that may be connected to a computer system. The USB specification is a proposed standard recently promulgated by a group of companies including Compaq Computer Corporation, Digital Equipment Corporation, International Business Machines Corporation, Intel Corporation, Microsoft Corporation, and Northern Telecom Limited. Described below are various aspects of the USB relevant to a complete understanding of the present invention. Further background concerning the USB may be obtained from USB Specification, Revision 1.1.

The USB is a serial bus that supports data exchanges between a host computer and as many as 127 devices on a single interrupt request line. This proved beneficial, especially when employed with processors that supported Intel's System management Mode architecture, such as Intel's Pentium® line of processors. Specifically, it was found that effectuating USB transactions in a processor's real-address mode limited the software platforms that may be supported for USB legacy support. Many of the software platforms remapped the interrupt vector table thereby frustrating transactions over the universal serial bus for USB legacy support. As a result, it is standard in the computer industry for USB legacy support to effectuate USB transactions when the processor operates in the system management mode (SMM).

A system management interrupt (SMI) applied to the SMI pin of the processor invokes the SMM mode. The SMI results from an interrupt request sent by, inter alia, a USB host controller. In response, the processor saves the processor's context and switches to a different operating environment contained in system management RAM (SMRAM). While in SMM, all interrupts normally handle by the operating system are disabled. Normal-mode, i.e., real-mode or protected-mode, operation of the processor occurs upon receipt of a resume (RSM) on the SMI pin. As can be readily seen, all USB transactions are associated with a common interrupt line, namely, the SMI pin.

To facilitate communication between the computer system and 127 peripheral devices over a common serial line, the USB specification defines transactions between a host in data communication with a plurality of devices over interconnects. The USB interconnect defines the manner in which the USB devices are connected to and communicate with the USB host controller. There is generally only one host on any USB system. A USB interface to the host computer system is referred to as the host controller. The host controller may be implemented in a combination of hardware, firmware, or software. USB devices are defined as (1) hubs, which provide additional attachment points to the USB, or (2) functions, which provide capabilities to the system; e.g., an ISDN connection, a digital joystick, or speakers. Hubs indicate the attachment or removal of a USB device in its per port status bit. The host determines if a newly attached USB device is a hub or a function and assigns a unique USB address to the USB device. All USB devices are accessed by a unique USB address. Each device additionally supports one or more endpoints with which the host may communicate.

FIG. 2 shows a computer system that employs a universal serial bus. The host computer 50 includes the I/O driver 52, a USB driver 54 and USB interface logic circuit 56. The I/O driver 52 continues to model the I/O device 58 as a group of registers. To access a hardware register in the I/O device 58, however, the I/O driver 52 first passes its read or write data request to the USB driver 54 that coordinates construction and transmission of the Token, Data and Handshake packets required by the USB protocol for transferring data to or from the I/O device 58. The CPU with USB port (device interface) 60 is connected to the I/O device 58 and is configured by the firmware 62 to act as an interface allowing I/O device 58 to communicate with the host via the USB. Device interface 60 receives and decodes incoming packets (e.g. host generated Token packets) and generates complimentary Data or Handshake packets needed to complete a data transfer between I/O device 58 and host computer 50. A drawback with USB-compatible peripheral devices is that many resources of existing computer systems, including the operating system, is not able to communicate with the same.

Recognizing the aforementioned problem with USB transactions, U.S. Pat. No. 5,896,534 to Pearce et al. discloses a conversion methodology to increase microprocessor performance characteristics. This is achieved using the System Management Mode ("SMM") of the microprocessor to provide transparent support of hardware components that include features unsupported by executing application and operating system programs. In one embodiment, a PC system includes code that supports only conventional but unavailable communication interfaces, but is equipped with a universal serial bus ("USB") controller. Although the USB controller is unsupported by the executing code, the application and operating system programs, the conversion methodology utilizes system management mode to facilitate transparent support for the USB controller. In SMM, a CPU executes SMM code independently of the operating system (s). The conversion methodology causes entry of SMM upon any I/O operation intended for the supported but unavailable conventional communication interfaces. The SMM code provides data from the USB controller in a format recognizable to the requesting non-supporting software. SMM code supports providing data that would otherwise be provided to supporting software. As mentioned above, however, multiple peripheral devices are typically connected to a common I/O port in a computer system employing the USB communication protocol. This increases the probability that information in the data transfer may be corrupted.

What is needed, therefore, is a technique for effectuating data transfers between computer system resources and multiple USB-compatible peripheral devices connected to a common I/O port without corrupting the information contained in the data transfer.

SUMMARY OF THE INVENTION

Provided is a method, a computer program product, and a computer system each of which features queuing data transfers between a data port and a system memory that avoids corrupting the data transfer while minimizing the latency between queuing a data transfer and effectuating the transfer of the same. This facilitates backwards compatibility of non-USB compatible computer resources, such as applications, operating systems (O/S) and the like, with USB compatible peripheral devices. To that end, in the method data transfers between the system memory and the data port include classification of multiple data transfers between the port and the system memory as being one of a plurality of classifications, defining a plurality of classified transfers. Each of the classified transfers is assigned to one of a plurality of queues dependent upon the classification, among the plurality of classifications, associated therewith. Each of the plurality of queues comprises a group of addresses in the system memory. The classified transfers are transmitted between the data port and the system memory, sequentially, defining a transfer sequence. The position of each of the plurality of classified transfers in the transfer sequence is dependent upon a predetermined set of parameters.

The computer system and computer program product each includes features that operate in accordance with the aforementioned method. Specifically, a plurality of USB I/O devices are in data communication with the data port, with the parameters including a quantity of bytes associated with the classified transfers and the frequency of transfer between one of the plurality of USB I/O devices and the port. Typically, the data transfers having a greater amount of data are located later in the sequence than data transfers having less amounts of data. Data transfers occurring more frequently are located later in the sequence than data transfers occurring less frequently. Examples of USB I/O devices include a USB mouse and a USB keyboard. The data transfers are classified as being associated with one of four classifications, each of which is uniquely associated with one of four queues. A first classification relates to information transferred to the first queue from the USB mouse independent of requests from the a computer system resource. A second classification relates to information transferred to a second queue from the USB mouse in response to a request for the information from a computer system resource. A third classification relates to information transferred to a third queue independent from the USB keyboard of requests from a computer system resource. A fourth classification relates to information from the USB keyboard transferred to a fourth queue in response to a request from a computer system resource.

DETAILED DESCRIPTION

Figure 1:
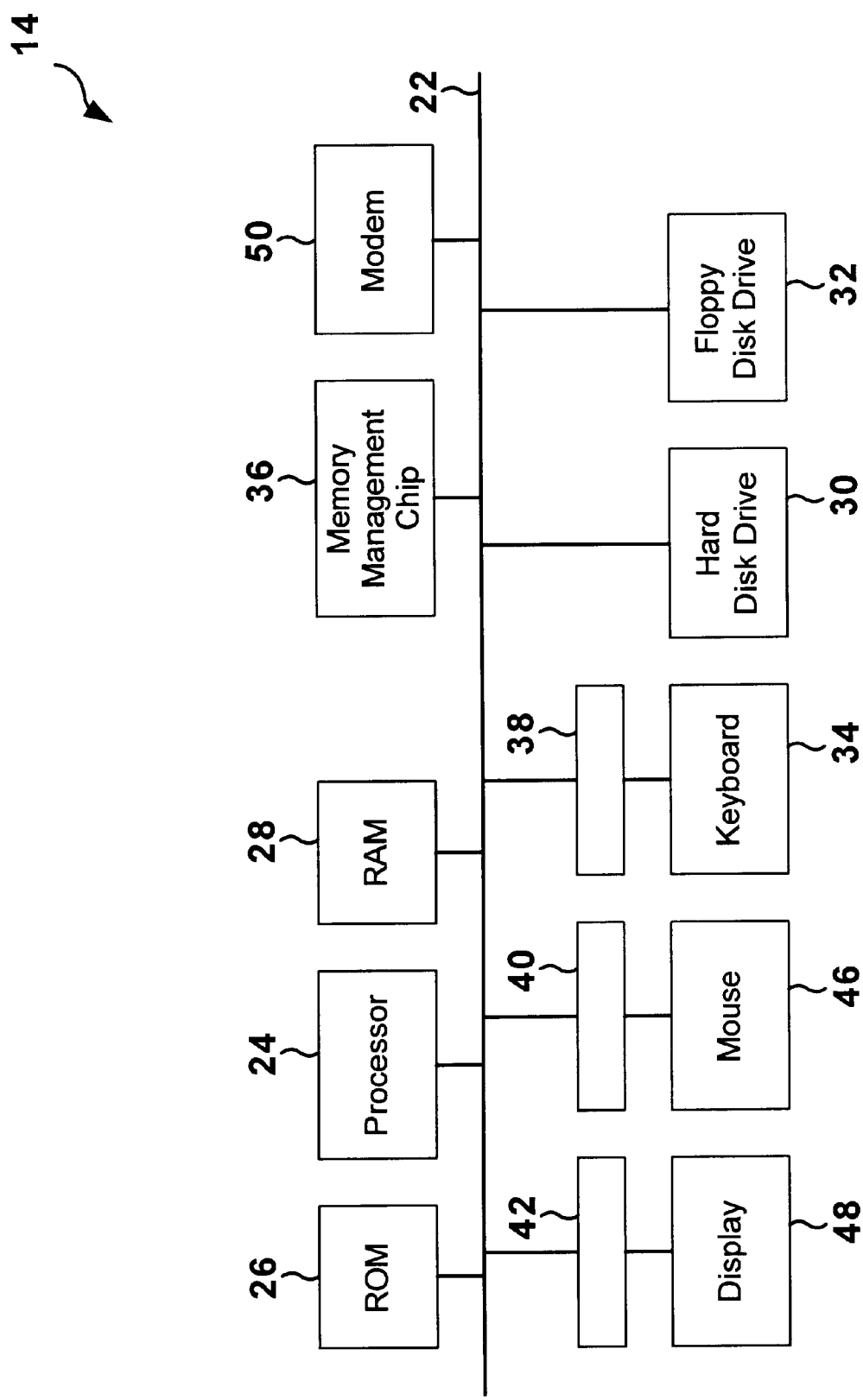
FIG. 1 is a schematic of a prior art computer system employing ISA and PCIA bus communication between a processor and an external device.
Figure 2:
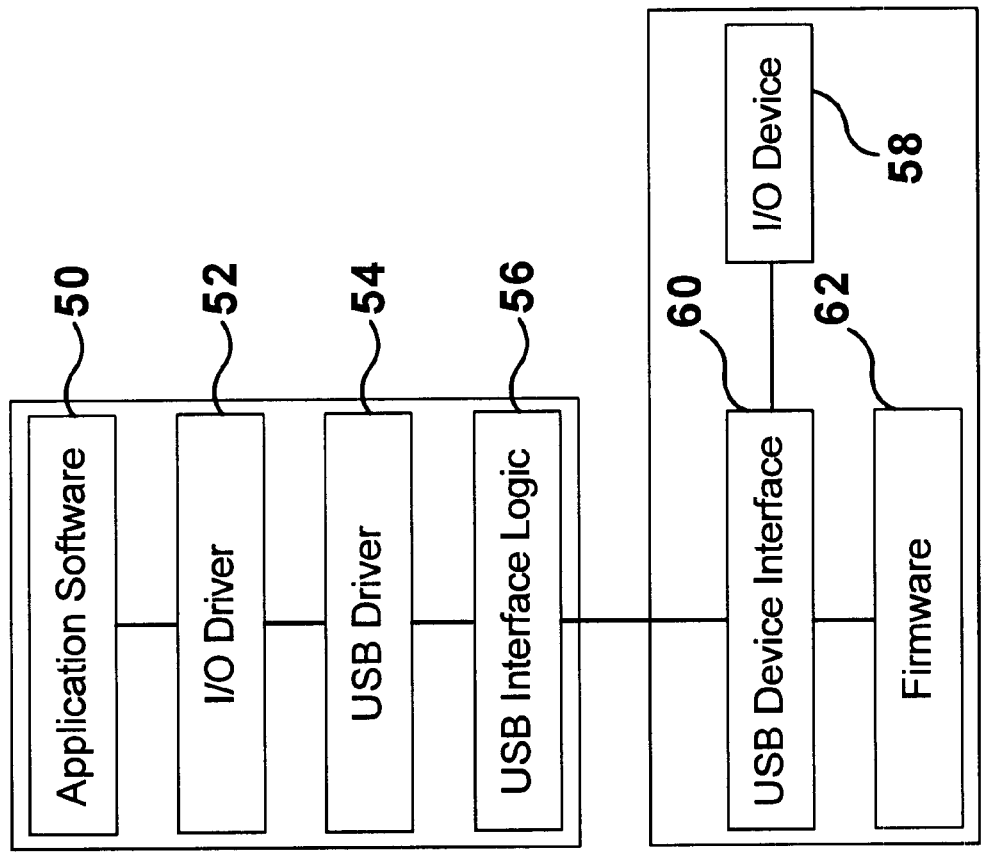
FIG. 2 is a prior art computer system employing a universal system bus specification to facilitate communication between a processor and an external device.
Figure 3:
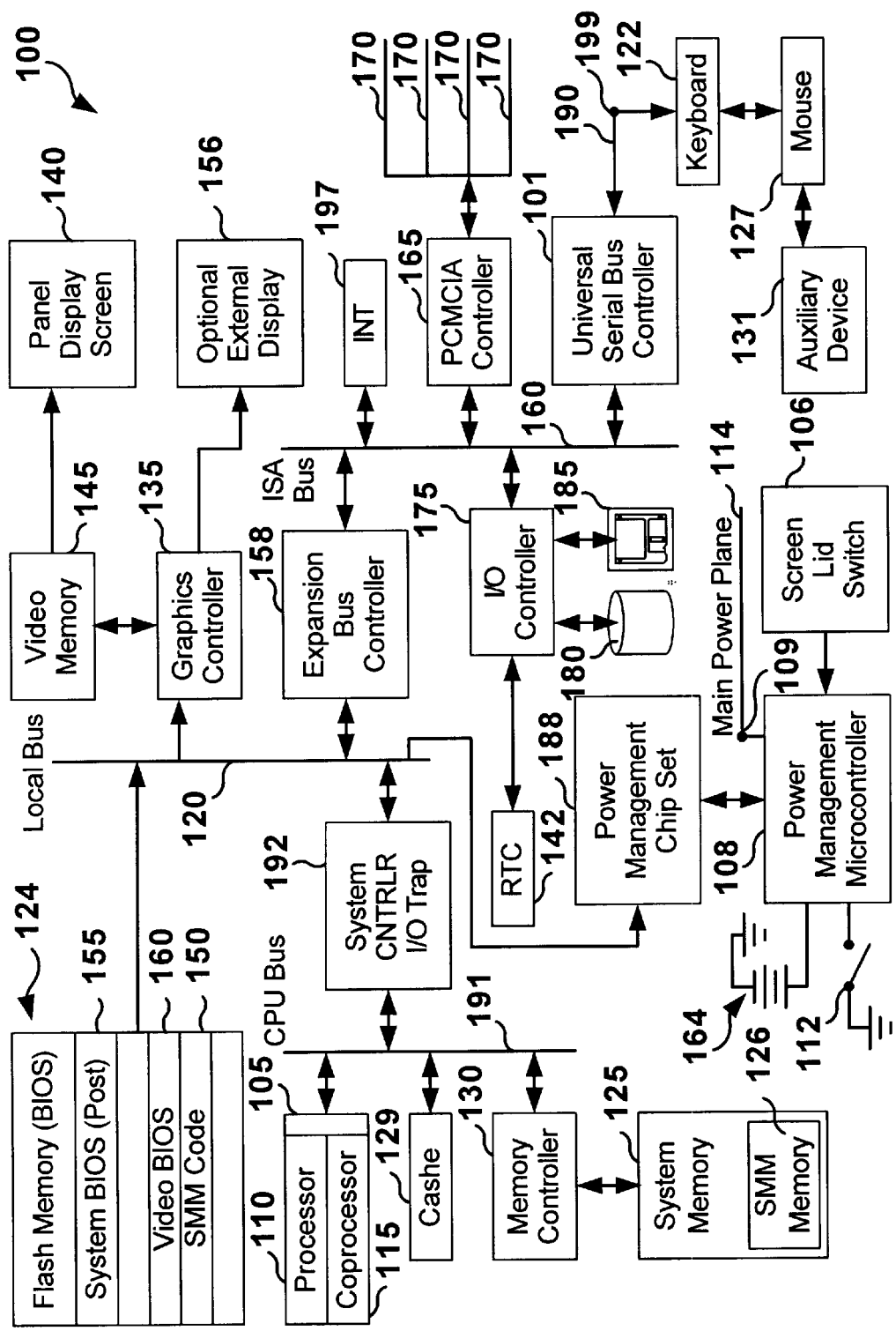
FIG. 3 is a plan view showing a computer system in accordance with the present invention.

Referring to FIG. 3 PC system 100 includes a microprocessor ("CPU") 105, for example, an Intel® Pentium® class microprocessor, having a processor 110 for handling integer operations and a coprocessor 115 for handling floating point operations. CPU 105 is coupled to cache 129 and memory controller 130 via CPU bus 191. System controller I/O trap 192 couples CPU bus 191 to local bus 120 and is generally characterized as part of a system controller such as a Pico Power Vesuvious or an Intel® Mobile Triton chip set. System controller I/O trap 192 can be programmed in a well-known manner to intercept a particular target address or address range.

A main memory 125 of dynamic random access memory ("DRAM") modules is coupled to local bus 120 by a memory controller 130. Main memory 125 includes a system management mode memory area that is employed to store converter code to implement conversion methodology embodiments as will be discussed in more detail subsequently. A (BIOS) memory 124 is coupled to local bus 120. A FLASH memory or other nonvolatile memory is used as BIOS memory 124. BIOS memory 124 stores the system code which controls some PC system 100 operations as discussed above.

A graphics controller 135 is coupled to local bus 120 and to a panel display screen 140. Graphics controller 135 is also coupled to a video memory 145 that stores information to be displayed on panel display 140. Panel display 140 is typically an active matrix or passive matrix liquid crystal display ("LCD") although other display technologies may be used as well. Graphics controller 135 can also be coupled to an optional external display or standalone monitor display 156 as shown in FIG. 3. One graphics controller that can be employed as graphics controller 135 is the Western Digital WD90C24A graphics controller.

A bus interface controller or expansion bus controller 158 couples local bus 120 to an expansion bus 160. In this particular embodiment, expansion bus 160 is an Industry Standard Architecture ("ISA") bus although other buses, for example, a Peripheral Component Interconnect ("PCI") bus, could also be used. A personal computer memory card international association ("PCMCIA") controller 165 is also coupled to expansion bus 160 as shown. PCMCIA controller 165 is coupled to a plurality of expansion slots 170 to receive PCMCIA expansion cards such as modems, fax cards, communications cards, and other input/output devices. Interrupt request generator 197 is also coupled to ISA bus 160 and issues an interrupt service request over a predetermined interrupt request line after receiving a request to issue interrupt instruction from CPU 105. An I/O controller 175, often referred to as a super I/O controller is coupled to ISA bus 160. I/O controller 175 interfaces to both an integrated drive electronics ("IDE") hard drive 180 and a floppy drive 185.

USB controller 101 transfers data to and from CPU 105 via ISA bus 160. Keyboard 122, mouse 127, and auxiliary device 131 are connected serially to USB connector 199. This interconnection topology is implemented according to the USB technology standard. External devices which include keyboard 122, mouse 127, and auxiliary device 131 communicate with CPU 105 via USB controller 101. Auxiliary devices may be any communication device such as a mouse, modem joystick, or another PC system. When USB controller 101 receives data from the connected external devices, USB controller 101 is connected to issue an interrupt to the SMI pin of the CPU 105, discussed more fully below.

PC system 100 includes a power supply 164 that may include an analog to digital converter to allow coupling the PC system 100 to an AC power source. Alternatively, a battery may provide power to the many devices that form PC system 100. In this embodiment, the power supply 164 may include a rechargeable battery, such as a nickel metal hydride ("NiMH") or lithium ion battery, where the PC system 100 is embodied as a portable or notebook computer. Power supply 164 is coupled to a power management microcontroller 108, which controls the distribution of power from power supply 164. More specifically, microcontroller 108 includes a power output 109 coupled to the main power plane 114 which supplies power to CPU 105. Power microcontroller 108 is also coupled to a power plane (not shown) which supplies power to panel display 140. In this particular embodiment, power control microcontroller 108 is a Motorola 6805 microcontroller. Microcontroller 108 monitors the charge level of power supply 164 to determine when to charge and when not to charge battery 164. Microcontroller 108 is coupled to a main power switch 112, which the user actuates to turn the PC system 100 on, and off. While microcontroller 108 powers down other portions of PC system 100 such as hard drive 180 when not in use to conserve power, microcontroller 108 itself is always coupled to a source of energy, namely power supply 164.

Were the PC system 100 a portable computer, a screen lid switch 106 or indicator 106 may be included that provides an indication of when panel display 140 is in the open position and an indication of when panel display 140 is in the closed position. It is noted that panel display 140 is generally located in the same location in the lid of the computer as is typical for "clamshell" types of portable computers such as laptop or notebook computers. In this manner, the display screen forms an integral part of the lid of the computer that swings from an open position for interaction with the user to a close position.

PC system 100 also includes a power management chip set 138 that includes power management chip models PT86C521 and PT86C522 manufactured by Pico Power. Power management chip set 138 is coupled to CPU 105 via local bus 120 so that power management chip set 138 can receive power control commands from CPU 105. Power management chip set 138 is connected to a plurality of individual power planes which supply power to respective devices in PC system 100 such as hard drive 180 and floppy drive 185, for example. In this manner, power management chip set 138 acts under the direction of CPU 105 to control the power to the various power planes and devices of the computer. A real time clock ("RTC") 140 is coupled to I/O controller 175 and power management chip set 138 such that time events or alarms can be transmitted to power management chip set 138. Real time clock 140 can be programmed to generate an alarm signal at a predetermined time.

When PC system 100 is turned on or powered up, the system BIOS software stored in non-volatile BIOS memory 124 is copied into main memory 125 so that it can be executed more quickly. This technique is referred to as "shadowing" or "shadow RAM" as discussed above. At this time, SMM code 150 is also copied into the system management mode memory area 126 of main memory 125. CPU 105 executes SMM code 150 after CPU 105 receives a system management interrupt ("SMI") which causes the microprocessor to enter SMM. It is noted that along with SMM code 150, also stored in BIOS memory 124 and copied into main memory 125 at power up are system BIOS 155 (including a power on self test module-POST) and video BIOS 160. Those of ordinary skill in the art will recognize that other memory mapping schemes may be used. For example, SMM code 150 may be stored in fast SRAM memory (not shown) coupled to the local/CPU bus 120.

Figure 4:
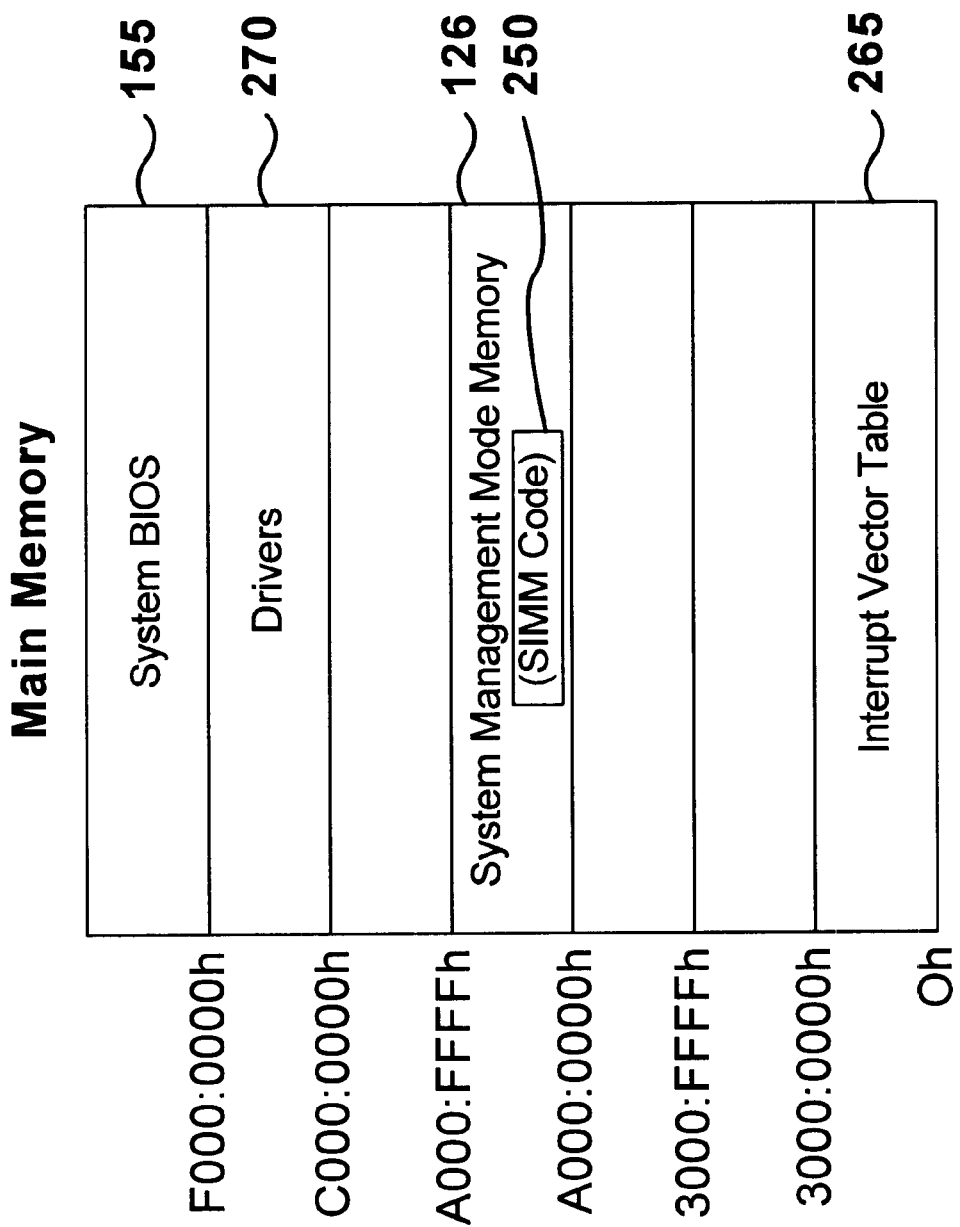
FIG. 4 is a simplified plan view showing a configuration of system memory shown above in FIG. 3.

Referring to FIG. 4, a diagram of main memory 125 illustrates SMM code 150 storage in system management mode memory area 126 after being loaded into main memory 125. In this particular embodiment, SMM memory area 126 resides between main memory addresses A000:000h and A000:FFFFh. Although SMM memory area 126 includes only 64 Kbytes, microprocessors such as the Pentium™ microprocessor can also access data outside system management mode memory area 126. Also loaded in main memory 125 at power up is an interrupt vector table 265 which is part of the system BIOS and directs the CPU 105 to particular interrupt handlers. Main memory 125 also includes device drivers 270 such as parallel and serial interface drivers. Memory areas not otherwise designated in main memory 125 of FIG. 4 are available for the operating system and user application programs.

Figure 5:
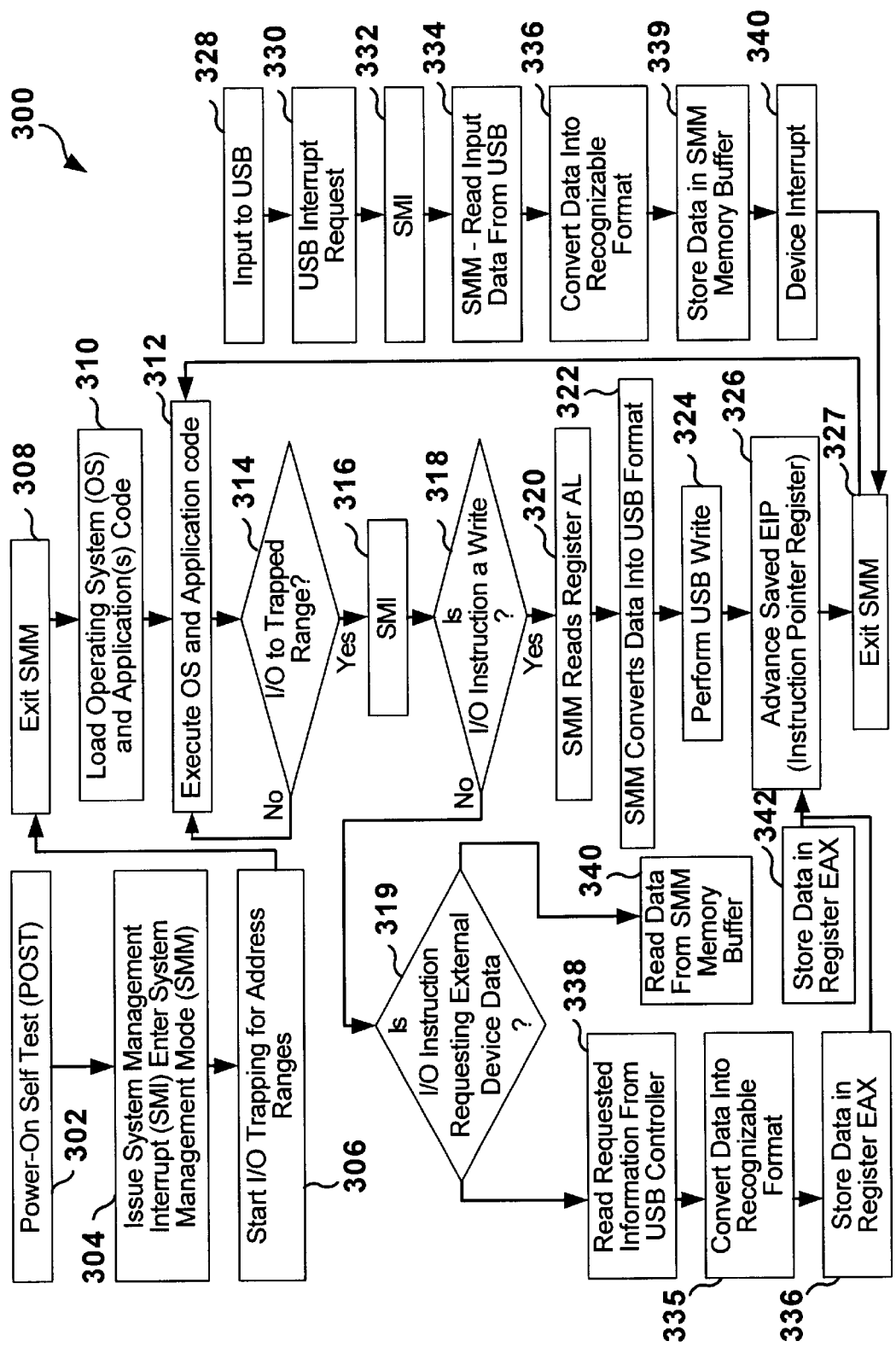
FIG. 5 is a flow diagram showing a prior art method to achieve data communication between USB-compatible devices and non-USB compatible computer resources.
Figure 6:
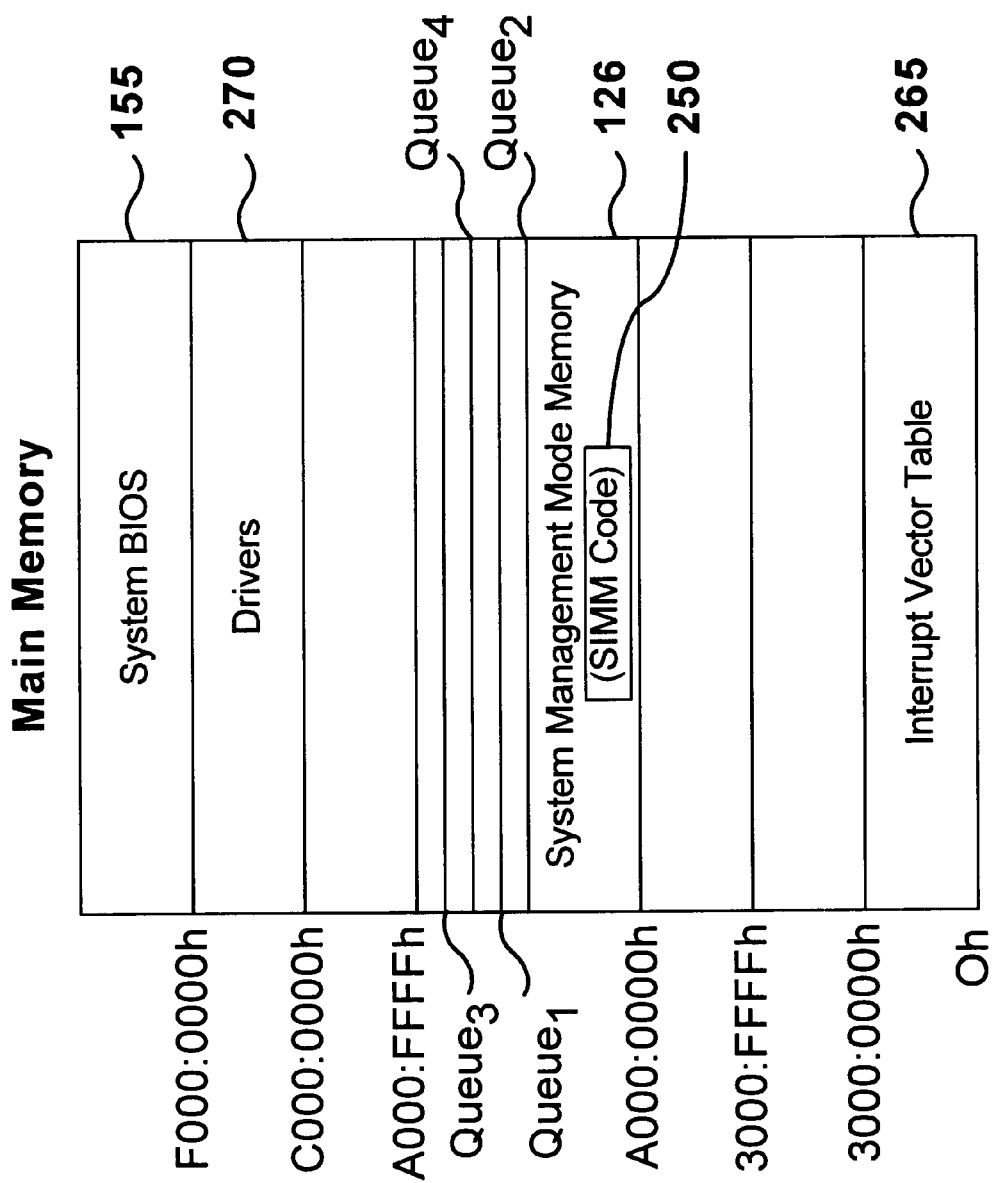
FIG. 6 is a simplified plan view showing a configuration of system memory shown in accordance with the present invention.

Referring to FIG. 5, with the system BIOS 155 thus copied into main memory 125, the power-on-self-test ("POST") module of BIOS executes to commence initialization of PC system 100 as step 302 indicates. The POST routine includes verification of system hardware functionality such as hard disk drive 180, CPU 105 registers, and floppy disk drive 185. If the POST attempts to access a communication interface not present in PC system 100, conversion methodology 300 will provide any requested data to the POST module. At this point, BIOS issues an SMI which causes CPU 105, in a well-known manner, to store current register values necessary to restore the original condition in main memory 125, initialize CPU 105 registers for SMM, and enter SMM as per step 304. Upon entering system management mode, I/O trapping of addresses within the range of addresses conventionally assigned to serial and parallel interfaces is initiated and commences as per step 306. This I/O trapping is implemented as discussed above by programming system controller I/O trap 192 to intercept I/O activity involving, for example, addresses that correspond to either port 378h or the serial port. System controller I/O trap 192 is also programmed to intercept communication between the USB controller 101 and CPU 105. One implementation embodiment of step 306 uses SMM code 150 to program system controller I/O trap 192 to intercept an attempted access by CPU 105 to the interface address range.

When system controller I/O trap 192 intercepts a target address, the I/O trap output signal line connected to the SMI pin of CPU 105 is activated causing CPU 105 to enter SMM as discussed above. Once I/O trapping has started, SMM is exited as per step 308 with an explicit resume from system management mode instruction such as RSM. The operating system and applications software are now loaded as per step 310. Execution of the operating system and applications software code commences at step 312.

With I/O trapping commenced, system controller I/O trap 192 traps all I/O addresses within a predetermined range that propagate between local bus 120 and CPU bus 191 as indicated in decision step 314. If the I/O address does not fall within the predetermined address range, the application code and OS continue executing. In this embodiment, system controller I/O trap 192 conducts a test to determine if an application code attempted to output information to a parallel interface having an address that corresponds to port 378h. This determination can be made, for example, by examining any I/O to the device instruction and comparing the associated instruction destination address associated with the aforementioned ports. If the intercepted address corresponds to the port 378h system controller I/O trap 192 traps the destination address and issues an SMI activation signal on the SMI pin of CPU 108. With the SMI issue, a system management interrupt occurs as indicated in step 316, and CPU 108 stores its current registers, including the current code segment ("CS") and extended instruction pointer ("EIP") registers, and begins executing SMN code in system management memory 126.

Conversion methodology 300 next determines whether or not the I/O instruction to the trapped address from the application code was a write or read instruction to the trapped range as indicated in decision step 318. In one embodiment, SMM code 150 uses the contents of the EIP register to examine the instruction that caused the SMI to issue. If SMM code 150 determines that the instruction requested a write operation (output to I/O device), SMM code 150 requests CPU 305 to read the contents of register AL as indicated in step 320. Step 320 indicates that the contents of register AL are read to determine the I/O information content written by the application program. In popular Intel® microprocessors and compatibles, register EAX contains the information to be written to I/O devices including communication interfaces. Register AL contains the least significant byte of information in extended accumulator register EAX.

In this embodiment, AL contains the complete I/O information content because information written to an I/O device can be constrained to be only one byte wide, and only AL need be read by SMM code 150. However, in other embodiments, EAX may be read wholly or partially as necessary according to the width of the data content transferred between an I/O device and a CPU.

After reading the contents of AL, SMM code 150 converts the data intended to be written to the trapped address, into a well-known USB format as indicated in step 322. SMM code 150 next, using well-known USB control instructions, requests CPU 105 to write the converted data to the USB controller 101. The type of written instruction can be determined by examining the application or OS instruction code and/or the destination address of the attempted write operation. For example, SMM code 150 recognizes a control register address, and would convert the requested interface control instruction to a corresponding USB control instruction.

After performing the function requested by the application, the saved contents of register EIP, are advanced according to the length of the requested operation, as indicated in step 326, so that CPU 105 executes the next application code instruction once emulation methodology returns to step 312. A resume from system management mode instruction is executed to exit SMM as indicated in step 327. Conversion methodology 300 then repeats from step 312.

Were SMM code 150 to determine that an application code instruction requested a read (input from I/O device) operation to a trapped range at 318, SMM code 150 proceeds to decision step 319 and determines whether or not the requested I/O instruction requested data received from an external device such as a parallel port and serial port. If external device input data is requested, SMM code 150, as indicated in step 340, instructs CPU 105 to read the data stored in the SMM memory buffer during execution of step 338 and to store the read data in register EAX. Conversion methodology 300 then proceeds to step 326 followed by steps 327 and 312. Recall that the input data to USB in the SMM memory buffer was previously converted in step 336 into a format recognizable by application code. The application code may now retrieve data from register EAX, which is where the application code expects the data to be located, and the retrieved data is in an expected and recognizable format to the application code.

Referring again to decision step 319, if SMM code 150 determines that rather than requesting received external device data, application code requested a different read operation, for example, interface status check, the conversion methodology 300 proceeds to step 338. SMM code 150 then instructs CPU 105 to read the requested information from the USB controller. For example, SMM code 150 requests a USB controller 101 status check. The USB controller 101 status check data is returned to CPU 105, and SMM code 150 converts the received status check information into a format recognizable to the requesting application code as indicated in step 336. SMM code 150 determines the proper format by examining the application code instruction and the associated destination address. SMM code 150 then instructs CPU 105 to store the requested, converted data in register EAX, where the data will be available and expected by the requesting application code. Conversion methodology then proceeds to step 326 to advance the saved EIP register contents in the manner described above followed by an exit from SMM as indicated in step 327 and a return to step 312.

In addition to the data transfers initiated by applications or the operating system, data transfers may be initiated by asynchronous activity to the USB controller. For example, while the CPU 305 is executing application code or performing other tasks, data input signals from parallel port or serial port may be received by USB controller 101 as indicated in step 328.

After receiving data transferred from, for example, the serial port interrupt logic (not shown) in USB controller 101 issues an interrupt service request to CPU 105 as indicated in step 330. System controller I/O trap 192 intercepts the interrupt service request and issues an SMI to CPU 105 signal in the same manner as discussed above in conjunction with step 316. CPU 105 responds and executes SMM code 150 which determines that an interrupt service request has been received from USB controller 101. SMM code 150 then passes a read I/O instruction to CPU 105 which reads the data input stored in a USB controller 101 output buffer as indicated in step 334. SMM code 150 then proceeds to convert the data into a format recognizable by the executing programs, as indicated in step 336, and CPU 105 is requested by SMM code 150 to store the USB output buffer contents in a reserved SMM memory buffer within SMM memory 126 as indicated in step 338. SMM code 150 subsequently passes a request to issue interrupt instruction to CPU 105 addressed to interrupt request generator 197. Interrupt request generator 197 issues an interrupt to CPU 105 over an interrupt request line conventionally utilized by a conventional communication interface. Conversion methodology 300 proceeds to step 327, and SMM is exited in the manner described above.

CPU 105 next responds to the interrupt request from interrupt generator 197, and a conventional communication interface interrupt handler executes in step 312 and passes a read I/O device instruction to CPU 105. System controller I/O trap 192 determines that the requested I/O operation is associated with a communication interface address, as indicated in step 314, and conversion methodology proceeds to decision step 318 as described above.

A concern with the data transfers described above is ensuring that the proper information is present to the requisite computer resource at the proper time. This concern is exacerbate d by the need to write information between multiple peripheral devices subject to data transfers through a common port, such as keyboard 122, mouse 127 and auxiliary device 131. For purposes of the present invention, examples of communication concerning the keyboard 122 and the mouse 127 will be discussed, with the understanding that it applies equally well with communications concerning the auxiliary device 131.

Data transfers between the computer resources and either a USB compatible keyboard 122 and a USB compatible mouse 127 occur through port 60h. As a result, a risk is present that the information in data transfer might be corrupted. To reduce the probability that data transfers between the operating system and port 60h will be corrupted the BIOS includes code that defines a synchronization algorithm to control the sequencing of data transfers between the operating system and both keyboard 122 and mouse 127.

After POST, the algorithm is resident in SMM memory at address A000. Specifically, after an SMI is issued at step 316, the SMM code 150 begins executing at address A000 at which point the algorithm associated therewith creates a plurality of buffers at specified addresses in the SMI memory, referred to as queues, shown as $queue_1$, $queue_2$, $queue_3$ and $queue_4$. Although any non-cacheable address may be employed to establish the aforementioned queues, the queues are typically established beginning at address A000.

The algorithm classifies the data transfer that resulted in the generation of the SMI as being one of four different classifications of data transfers. A first classification relates to information from the keyboard in response to a request from one of the system resources. A second classification relates to information transferred from the mouse in response to a request for the information from one of the system resources. A third classification relates to information transferred from the keyboard independent of requests from one of the system resources. A fourth classification relates to information transferred from the mouse independent of requests from a system resource, such as an application, the operating system, the BIOS and the like.

Each of the plurality of queues, $queue_1$, $queue_2$, $queue_3$ and $queue_4$ are uniquely associated with one of the aforementioned classifications of data transfers. Specifically, the first classification of data transfers is associated with $queue_1$; the second classification of data transfers is associated with $queue_2$; the third classification of data transfers is associated with $queue_3$; and the fourth classification of data transfers is associated with $queue_4$. In this manner, data transfers to occur through the ports associated with one of the aforementioned trapped addresses are temporarily stored in one of $queue_1$, $queue_2$, $queue_3$ and $queue_4$, dependent upon the classification of the data transfer. The data transfers present in $queue_1$, $queue_2$, $queue_3$ and $queue_4$ are transmitted between the data port and the system memory sequentially, defining a transfer sequence. The position of each of the plurality of classified transfers in the transfer sequence is dependent upon a predetermined set of parameters. Such parameters include a quantity of bytes associated with the classified transfer, the frequency of a data transfer between the system resources and either the keyboard or mouse. Typically, data transfers having a greater amount of data are located later in the transfer sequence than data transfers having less amounts of data, and data transfers occurring more frequently are located later in said sequence than data transfers occurring less frequently. This keeps a low amount of data device from being "starved."

Figure 7:
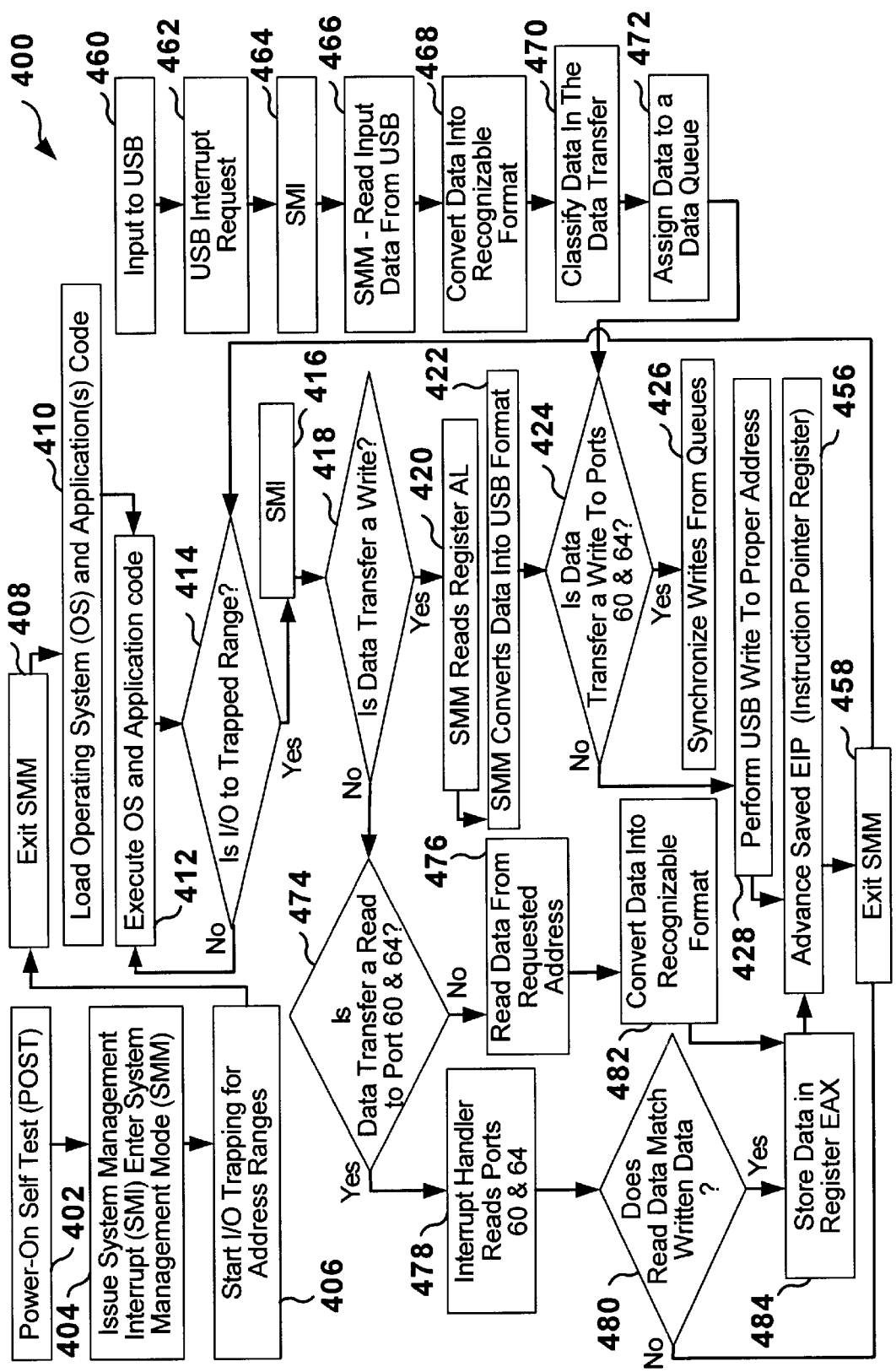
FIG. 7 is a flow diagram showing a method to achieve data communication between USB-compatible devices and non-USB compatible computer resources in accordance with the present invention.
Figure 8:
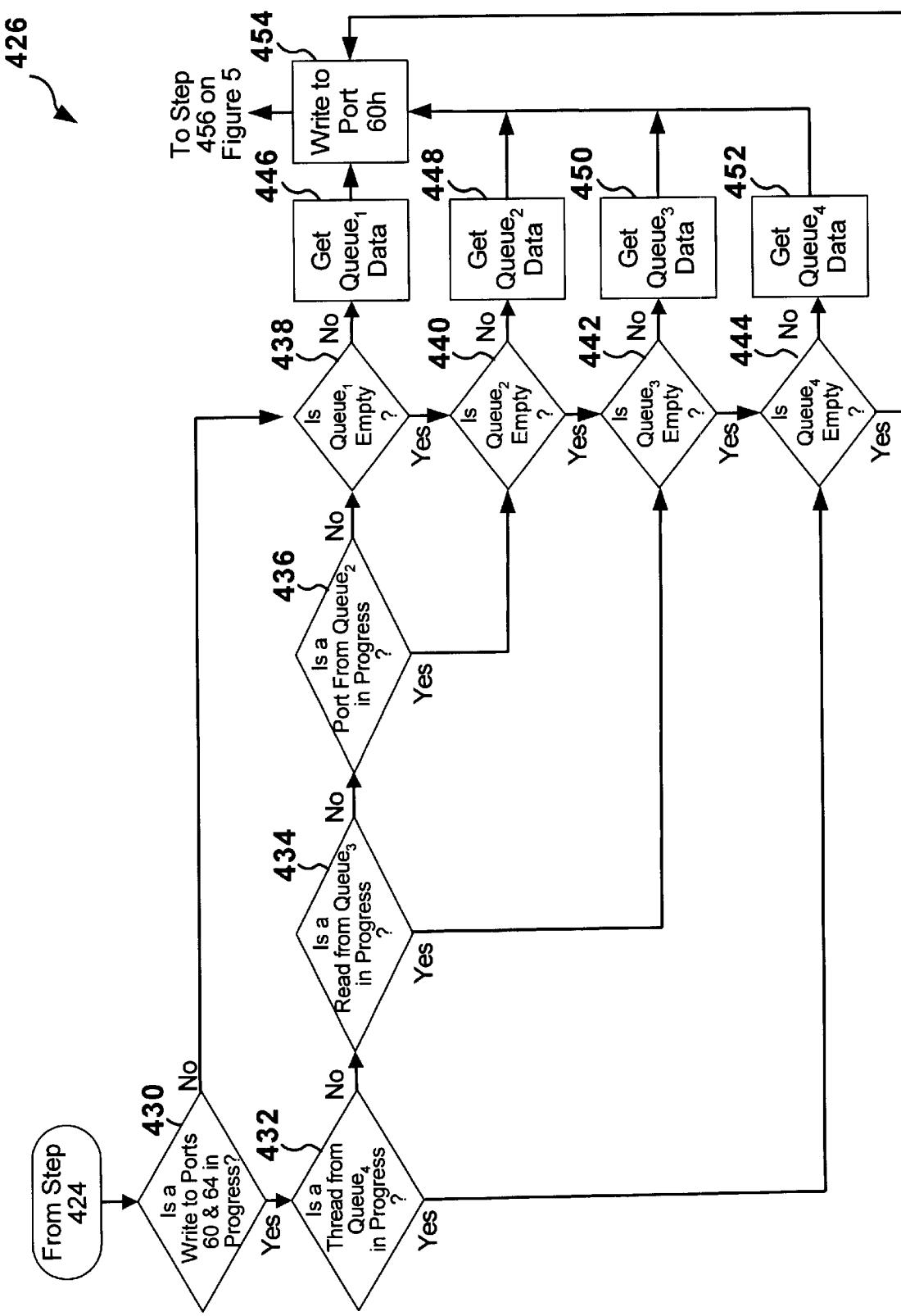
FIG. 8 is a flow diagram showing, in detail, the steps implemented to achieve one of the steps shown above in FIG. 7.

To that end, as shown in FIG. 7, the present invention arranges writes to ports 60 and 64 using a method 400 that includes steps 402, 404, 406, 408, 410, 412, 414 and 416 that are identical to steps 302, 304, 306, 308, 310, 312, 314 and 316, mentioned above with respect to FIG. 5. Following step 416, the data transfer associated with the trapped I/O address is determined to be a write. Were the data transfer determined to be a write operation, the SMM code 150 reads the AL register at step 420 and converts the data transfer to the USB format at step 422. At step 424, the SMM code 150 determines whether the data transfer is a write to port 60 and port 64. Were the data transfer determined to be a write to the aforementioned ports, then a synchronization algorithm is asserted to ensure that no information written to port 60 is corrupted. To that end, the synchronization algorithm includes first determining whether a write operation is currently being performed to ports 60 and 64. Were a write being performed the algorithm would go through a sequence of decisions, shown as steps 432, 434 and 436 to ensure that any existing write operation was completed before the write operation identified at step 424 was commenced.

Assuming that an existing write operation was not identified at step 430, then the algorithm goes through a sequence of decisions, shown as steps 438, 440, 442 and 444 to ensure that the data transfer with the least amount of information associated therewith is written to port 60 before data transfers with greater amounts of data. To that end, it is first determined whether the $queue_1$ includes information before it is determined whether any of the remaining queues have information therein. Were $queue_1$ determined not to have any information contained therein, then it is next determined whether $queue_2$ has any information associated therewith. Thereafter, it is determined whether $queue_3$ has any information associated therewith and finally $queue_4$.

Immediately, after determining whether any of the aforementioned queues had data associated therewith, then the data is retrieved from the appropriate queue at one of steps 446, 448, 450 and 452. Following the retrieval of information at step 446, 448, 450 and 452, the data is written to port 60 at step 454. Note, however, that the data is written to port 60 at step before it is determined whether there is any information in any additional queues. After step 454, the contents of register EIP, are advanced according to the length of the write operation at step 456, so that CPU 105 executes the next application code instruction at step 414 once SMM is exited at step 458, as discussed above.

Data is also stored in queue$_1$–queue$_4$ by activity from the USB controller through the implementation of steps 460, 462, 464, 466, 468 that are identical to steps 328, 330, 332, 334, 336 discussed above with respect to FIG. 5. After the data received from the USB controller at step 466, the data is converted into a recognizable format, e.g., PS2, at step 468. At step 470, the data transfer received by the USB controller is classified at step 470 as being one of the four aforementioned classifications. Thereafter, the data transfer is assigned to one of the aforementioned queues, queues$_1$–queue$_4$, at step 472.

After classification and assignment of the data transfers at steps 470 and 472, step 424 to determine whether a write to port 60 is to be effectuated. Upon determining that a write to port 60 is to be achieved, the steps mentioned above are invoked. Instead of the OS reading the information in port 60, upon exiting SMM at step 458, as discussed above, step 414 determines whether one of the I/O data transfers is for port 60. After determining that the data transfer is for port 60, an SMI is asserted at step 416. Since the operation of the USB controller was a write to port 60, step 418 identifies the operation as a read operation which results in the data transfer subsequently being identified as a read of port 60 at step 474. At step 478 an interrupt handle reads the ports and at step 480 it is determined whether the data read at step 478 matches the data written to the ports at step 454. Were the data transfer from the keyboard then an interrupt IRQ 1 handler would read the ports. Were the data transfer from the mouse, then an interrupt handler IRQ 12 would read the port. Were a match found, then steps 484 and 456 are invoked, as mentioned above, followed by the CPU 105 exiting SMM at step 458.

It should be understood that the invention described above in merely exemplary. For example, step 438 and steps 440, shown in FIG. 7, may be reversed since the data transfers associated with those queues are essentially the same size. Were the latency between successive writes to port 60 not a concern, then steps 438, 440, 442 and 444 could occur in any order. The present invention should not, therefore, be determined with respect to the above-described exemplary embodiments. Rather, the breadth of the present invention should be determined with respect to the claims recited below, including the full scope of equivalents thereof.

What is claimed is:

1. A method of transferring data between a port and a system memory in a computer system, said method comprising:

classifying multiple data transfers between said port and said system memory as being one of a plurality of classifications, defining a plurality of classified transfers;

assigning each of said plurality of classified transfers to one of a plurality of queues dependent upon the classification, among said plurality of classifications, associated therewith, with each of said plurality of queues comprising a group of addresses in said system memory; and transmitting said plurality of classified transfers between said port and said system memory sequentially, defining a transfer sequence, with a position of each of the plurality of classified transfers in said transfer sequence being dependent upon a predetermined set of parameters.

2. The method as recited in claim 1 wherein said predetermined set of parameters includes a quantity of bytes associated with said classified transfers.

3. The method as recited in claim 1 further including providing a plurality of I/O devices in data communication with said port wherein said predetermined set of parameters includes a frequency of transfer between one of said plurality of I/O devices and said port.

4. The method as recited in claim 2 wherein data transfers having a greater amount of data are located later is said sequence than data transfers having less amounts of data.

5. The method as recited in claim 1 wherein said predetermined set of parameters includes the classification of said plurality of classifications associated with said classified transfers.

6. The method as recited in claim 4 wherein data transfers occurring more frequently are located later in said sequence that data transfers occurring less frequently.

7. The method as recited in claim 1 further including providing a keyboard and a mouse, both of which are in data communication with said port, and a processor in data communication with an operating system of said computer system wherein said plurality of classifications include a first pair and a second pair of classifications, with said first pair relating to data transfers between said mouse and said system memory and said second pair relating to transfers between said keyboard and said system memory.

8. The method as recited in claim 1 further including providing a USB keyboard and a USB mouse, both of which are in data communication with said port, and a processor in data communication with an operating system of said computer system wherein said plurality of classifications consists a first, a second, a third and a fourth classifications, with each of said plurality of queues being uniquely therewith, defining a first, a second, a third and a fourth queue, with said first classification relating to information transferred to said first queue from said mouse independent of requests from said BIOS, said second classification relating to information transferred to a second queue from said USB mouse in response to a request for said information from said BIOS, a third classification relating to information transferred to a third queue independent of requests from said BIOS, a fourth classification relating to information from said USB keyboard transferred to a fourth queue in response to a request from said BIOS.

9. The method as recited in claim 1 wherein said plurality of queues are located in SMI memory.

10. A computer program product to transfer data between a port and a system management memory in a computer system, said computer program product comprising:

code to classify multiple data transfers between said port and said system memory as being one of a plurality of classifications, defining a plurality of classified transfers;

code to assign each of said plurality of classified transfers to one of a plurality of queues dependent upon the classification, among said plurality of classifications, associated therewith, with each of said plurality of queues comprising a group of addresses in said system memory; and code to transmit said plurality of classified transfers between said port and said system memory sequentially, defining a transfer sequence, with a position of each of the plurality of classified transfers in said transfer sequence being dependent upon a predetermined set of parameters.

11. The computer program product as recited in claim 1 wherein said predetermined set of parameters includes a quantity of bytes associated with said classified transfers.

12. The computer program product as recited in claim 1 further including code to provide a plurality of I/O devices in data communication with said port wherein said predetermined set of parameters includes a frequency of transfer between one of said plurality of I/O devices and said port.

13. The computer program product as recited in claim 2 wherein data transfers having a greater amount of data are located later is said sequence that data transfers having less amounts of data.

14. The computer program product as recited in claim 1 wherein said predetermined set of parameters includes the classification of said plurality of classifications associated with said classified transfers.

15. The computer program product as recited in claim 4 wherein data transfers occurring more frequently are located later in said sequence that data transfers occurring less frequently.

16. The computer program product as recited in claim 1 further including a USB keyboard and a USB mouse, both of which are in data communication with said port, and a processor in data communication with an operating system of said computer system wherein said plurality of classifications include a first pair and a second pair of classifications, with said first pair relating to data transfers between said USB mouse and said system memory and said second pair relating to transfers between said USB keyboard and said system management memory.

17. The computer program product as recited in claim 1 further including a USB keyboard and a USB mouse, both of which are in data communication with said port, and a processor in data communication with an operating system of said computer system wherein said plurality of classifications consists a first, a second, a third and a fourth classifications, with each of said plurality of queues being uniquely therewith, defining a first, a second, a third and a fourth queue, with said first classification relating to information transferred to said first queue from said USB mouse independent of requests from said BIOS, said second classification relating to information transferred to a second queue from said mouse in response to a request for said information from said BIOS, a third classification relating to information transferred to a third queue independent of requests from said BIOS, a fourth classification relating to information from said USB keyboard transferred to a fourth queue in response to a request from said BIOS.

18. The computer program product as recited in claim 1 wherein said plurality of queues are located in SMI memory.

19. A computer system comprising:
a memory having a program stored therein;
a port in data communication with said memory communication bus;
a plurality of I/O devices in data communication with said port;
a processor, in data communication with said memory and said port plurality of I/O devices, with said program including program code to classify multiple data transfers between said port and said system memory as being one of a plurality of classifications, defining a plurality of classified transfers and assign each of said plurality of classified transfers to one of a plurality of queues dependent upon the classification, among said plurality of classifications, associated therewith, with each of said plurality of queues comprising a group of addresses in said system memory; and transmit said plurality of classified transfers between said port and said system memory sequentially, defining a transfer sequence, with a position of each of the plurality of classified transfers in said transfer sequence being dependent upon a predetermined set of parameters.

20. The computer system as recited in claim 19 wherein said predetermined set of parameters includes a quantity of bytes associated with said classified transfers.

21. The computer system as recited in claim 19 wherein said predetermined set of parameters includes a quantity of bytes associated with said classified transfers.

22. The computer system as recited in claim 19 wherein said program further includes code to provide a plurality of I/O devices in data communication with said port wherein said predetermined set of parameters includes a frequency of transfer between one of said plurality of I/O devices and said port.

23. The computer system as recited in claim 20 wherein data transfers having a greater quantity of bytes are located later in said sequence that data transfers having a lesser quantity of bytes.

24. The computer system as recited in claim 19 wherein said predetermined set of parameters includes the classification of said plurality of classifications associated with said classified transfers.

25. The computer system as recited in claim 21 wherein data transfers occurring more frequently are located later in said sequence that data transfers occurring less frequently.

26. The computer system as recited in claim 19 further including a keyboard and a mouse, both of which are in data communication with said port, and a processor in data communication with an operating system of said computer system wherein said plurality of classifications include a first pair and a second pair of classifications, with said first pair relating to data transfers between said USB mouse and said system memory and said second pair relating to transfers between said USB keyboard and said system management memory.

27. The computer program product as recited in claim 19 further including a keyboard and a mouse, both of which are in data communication with said port, and a processor in data communication with an operating system of said computer system wherein said plurality of classifications consists a first, a second, a third and a fourth classifications, with each of said plurality of queues being uniquely therewith, defining a first, a second, a third and a fourth queue, with said first classification relating to information transferred to said first queue from said USB mouse independent of requests from said BIOS, said second classification relating to information transferred to a second queue from said USB mouse in response to a request for said information from said BIOS, a third classification relating to information transferred to a third queue from said USB keyboard independent of requests from said BIOS, a fourth classification relating to information from said USB keyboard transferred to a fourth queue in response to a request from said BIOS.

28. The computer program product as recited in claim 19 wherein said plurality of queues are located in SMI memory.

* * * * *